US010249965B2

United States Patent
Okazaki et al.

(10) Patent No.: US 10,249,965 B2
(45) Date of Patent: Apr. 2, 2019

(54) BUSBAR

(71) Applicant: Yazaki Corporation, Minato-ku, Tokyo (JP)

(72) Inventors: Yutaro Okazaki, Kakegawa (JP); Akito Toyama, Makinohara (JP); Shuhei Ejima, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/866,714

(22) Filed: Jan. 10, 2018

(65) Prior Publication Data

US 2018/0219309 A1     Aug. 2, 2018

(30) Foreign Application Priority Data

Jan. 31, 2017 (JP) ................. 2017-016298

(51) Int. Cl.
| | |
|---|---|
| *H01R 11/28* | (2006.01) |
| *H01M 10/48* | (2006.01) |
| *H01M 2/10* | (2006.01) |
| *H01M 2/20* | (2006.01) |
| *H01R 4/18* | (2006.01) |
| *H01M 2/30* | (2006.01) |

(52) U.S. Cl.
CPC ........ *H01R 11/288* (2013.01); *H01M 2/1077* (2013.01); *H01M 2/206* (2013.01); *H01M 10/482* (2013.01); *H01R 4/184* (2013.01); *H01R 4/185* (2013.01); *H01M 2/305* (2013.01); *H01M 2220/20* (2013.01)

(58) Field of Classification Search
CPC ...... H01R 11/288; H01R 4/185; H01R 4/184; H01M 2/1077; H01M 10/482; H01M 2/206; H01M 2/305; H01M 2220/20
See application file for complete search history.

(56) References Cited

U.S. PATENT DOCUMENTS

| 8,033,875 B1* | 10/2011 | Maguire | H01M 2/206 439/762 |
|---|---|---|---|
| 2006/0270286 A1* | 11/2006 | Zhao | H01M 2/206 439/840 |
| 2007/0207349 A1* | 9/2007 | Kemper | H01M 2/1077 429/9 |
| 2012/0208410 A1* | 8/2012 | Ikeda | H01M 2/206 439/883 |

(Continued)

FOREIGN PATENT DOCUMENTS

JP     2016-091772 A     5/2016

*Primary Examiner* — Truc T Nguyen
(74) *Attorney, Agent, or Firm* — Banner & Witcoff, Ltd.

(57) ABSTRACT

A busbar includes a plate-shaped body section and a wire connection section extended from the body section. The body section includes a first plate section, a second plate section, and a folding-back section connecting the first plate section and the second plate section. The first plate section and the second plate section are stacked mutually by folding-back the folding-back section. The first plate section has an outer shape that is positioned to a busbar accommodation section of a wire routing member made of insulation resin. A maximum width dimension of the second plate section in a direction parallel to the folding-back section is smaller than that of the first plate section in the direction parallel to the folding-back section.

6 Claims, 9 Drawing Sheets

(56) References Cited

U.S. PATENT DOCUMENTS

| | | | |
|---|---|---|---|
| 2013/0089996 A1* | 4/2013 | Zhao | H01M 2/206 439/212 |
| 2015/0180143 A1* | 6/2015 | Iwata | H01R 11/285 439/754 |
| 2015/0236436 A1* | 8/2015 | Freitag | H01R 11/287 439/763 |
| 2018/0166840 A1* | 6/2018 | Okazaki | H01R 11/281 |

* cited by examiner

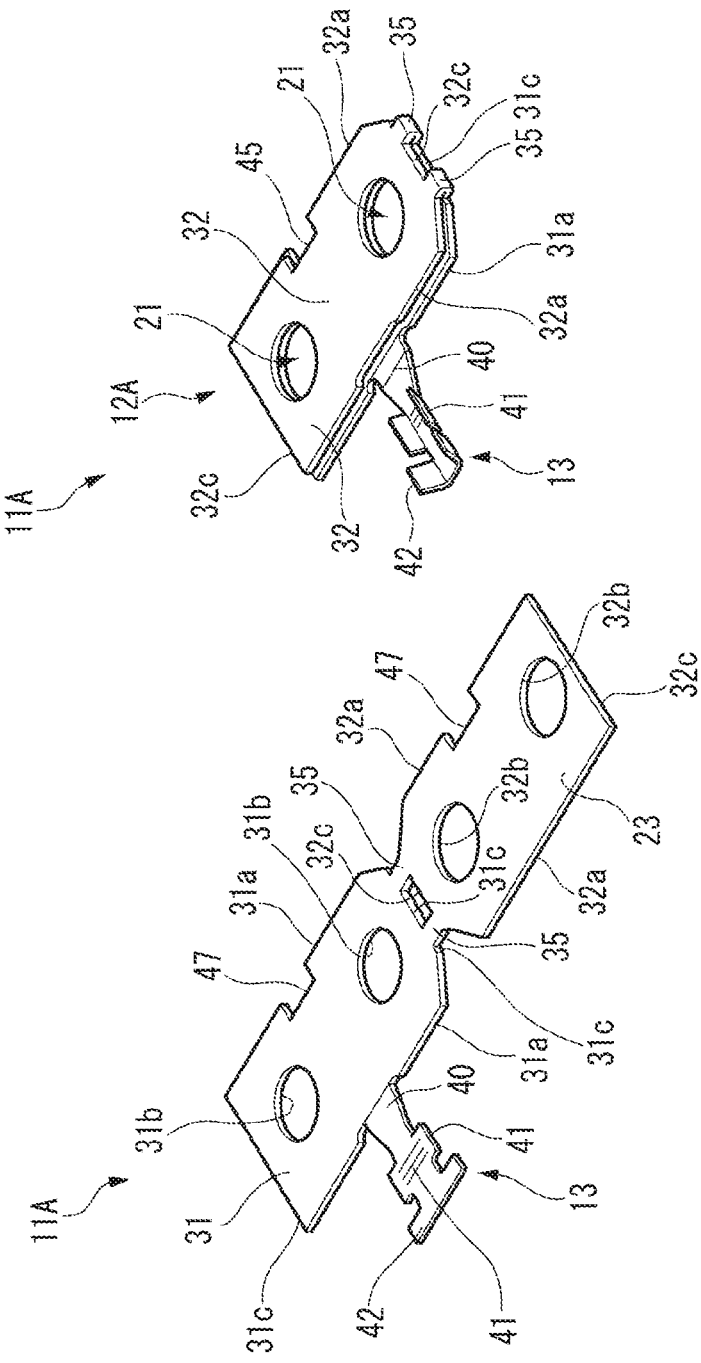

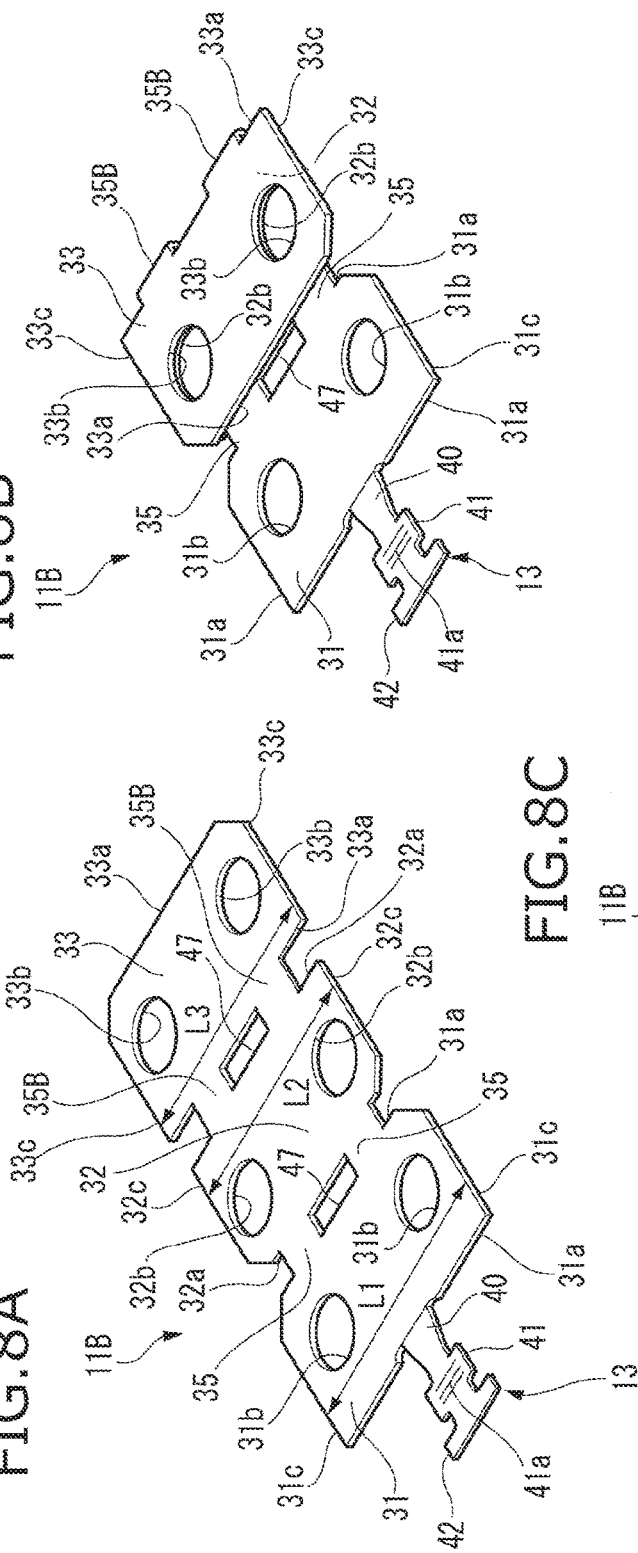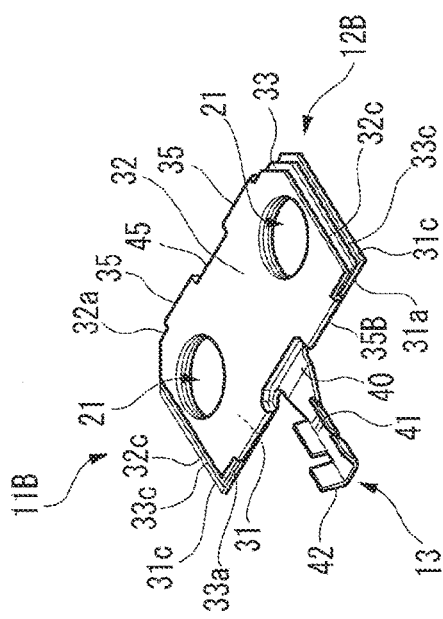

BUSBAR

CROSS REFERENCE TO RELATED APPLICATIONS

This application is based on Japanese Patent Application (No. 2017-016298) filed on Jan. 31, 2017, the contents of which are incorporated herein by reference.

BACKGROUND OF THE INVENTION

1. Field of the Invention

The present invention relates to a busbar for electrically connecting the mutually adjacent unit cells of a battery assembly.

2. Description of the Related Art

In a battery assembly provided with a plurality of unit cells, the mutually adjacent electrode terminals of each unit cell are electrically connected by a busbar.

As shown in FIG. 10, a busbar is available which is integrally composed of a plate-shaped body section 501 bridged between mutually adjacent electrode terminals and a wire connection section 502 extended from the body section 501 and connected to the end portion of a detecting wire, wherein the body section 501 is formed into a two-layer structure such that the first plate section 504 and the second plate section 505 thereof divided by a folding-back section 503 are folded back by 180 degrees at the folding-back section 503 and stacked on each other (refer to JP-A-2016-91772).

In this kind of busbar, the engagement pieces 506 extended to the long-side edge section 504a of the first plate section 504 being parallel to the folding-back section 503 are bent along the outer face of the second plate section 505 to prevent the first plate section 504 and the second plate section 505 from opening. Furthermore, in the above-mentioned busbar, at the side edge sections of the first plate section 504 excluding the folding-back section 503, side edge covering sections 507 standing upright along the side edge sections of the second plate section 505 excluding the folding-back section 503 are formed to prevent foreign matter from entering the space between the layers.

This kind of busbar is held by an engagement section in the busbar accommodation section of an insulation holding member (wire routing member) that is made of insulation resin and mounted on a battery assembly, thereby fastening the mutually adjacent electrode terminals of a plurality of unit cells to connection holes 509 to make electrical connection. With this busbar, the first plate section 504 and the second plate section 505 are folded back at the folding-back section 503, whereby the electric resistance thereof can be reduced while the cross-sectional area thereof is obtained securely.

However, since the above-mentioned conventional busbar has variations in its bent shape, the first plate section 504 and the second plate section 505 are stacked while deviating from each other, whereby there is a risk that the connection holes 509 of the first plate section 504 may not be aligned with the connection holes 509 of the second plate section 505. Furthermore, if the first plate section 504 and the second plate section 505 are stacked while deviating from each other, there is a risk that the positioning accuracy of the busbar may be lowered and the busbar cannot be accommodated in the busbar accommodation section of the wire routing member.

Although the deviation in the above-mentioned busbar can be suppressed by providing the side edge covering sections 507, the processing for providing the side edge covering sections 507 is complicated and increases the cost of the busbar. Furthermore, in the above-mentioned busbar, the connection hole 509 is composed of the first connection hole of the first plate section 504 and the second connection hole of the second plate section 505. Moreover, when the busbar is press-worked, the edge of the first connection hole is raised upright so as to be fitted along the edge of the second connection hole, and an edge covering section for covering the entire edge of the connection hole is formed, whereby the deviation can be suppressed. However, there is a problem that the processing for forming the edge covering section is also complicated and increases the cost of the busbar as in the processing for providing the side edge covering sections 507.

SUMMARY OF THE INVENTION

The present invention has been made in consideration of the above-mentioned circumstances, and an object of the present invention is to provide a busbar being made simple in structure and capable of improving the assembling performance of the busbar to a busbar accommodation section regardless of the deviation of the plate sections thereof stacked mutually.

The above-mentioned object of the present invention is attained by the configurations described below.

(1) A busbar including:

a plate-shaped body section configured to connect adjacent electrode terminals of a plurality of unit cells each having positive and negative electrode terminals; and a wire connection section integrally provided on and extended from the body section, and configured to connect an end portion of a wire, wherein the body section includes a first plate section, a second plate section, and at least one folding-back section connecting the first plate section and the second plate section;

wherein the first plate section and the second plate section are stacked mutually by folding-back the at least one folding-back section;

wherein the first plate section has an outer shape that is positioned to a busbar accommodation section of a wire routing member made of insulation resin; and wherein a maximum width dimension of the second plate section in a direction parallel to the at least one folding-back section is smaller than that of the first plate section in the direction parallel to the at least one folding-back section.

(2) The busbar set forth in the above-mentioned item (1), wherein a difference between the maximum width dimension of the first plate section and the maximum width dimension of the second plate section in the direction parallel to the at least one folding-back section is set to a dimension capable of allowing a bending deviation amount of the second plate section with respect to the first plate section.

(3) The busbar set forth in the above-mentioned item (1) or (2), wherein a through hole for connection to the electrode terminal is formed in the body section;

wherein a first connection hole of the first plate section and a second connection hole of the second plate section configures the through hole; and wherein an opening diameter of the second connection hole of the second plate section is larger than that of the first connection hole of the first plate section.

(4) The busbar set forth in any one of the above-mentioned items (1) to (3), wherein the wire connection section is integrally provided on the first plate section of the body section.

(5) The busbar set forth in any one of the above-mentioned items (1) to (4), wherein a width dimension of a side edge section of the second plate section along a direction substantially parallel to a folding-back axis of the at least one folding-back section is smaller than that of the first plate section along the direction substantially parallel to the folding-back axis of the at least one folding-back section.

(6) The busbar set forth in any one of the above-mentioned items (1) to (5), wherein the at least one folding-back section is two folding-back sections which are separated with an air gap.

With the busbar configured as described above, even if the second plate section has deviated with respect to the first plate section when they are folded and stacked, since the outermost dimension of the busbar (the maximum width dimension in a direction parallel to the folding-back section) depends on the tolerance of the dimension of the first plate section, the positioning of the busbar to the busbar accommodation section is not affected by the bending deviation amount (processing error during bending) of the second plate section.

With the busbar configured as described above, the dimensional difference between the second plate section and the first plate section is minimized, whereby the busbar can be suppressed from expanding wastefully.

With the busbar configured as described above, even if the second plate section has deviated with respect to the first plate section when they are folded and stacked, the connection holes do not overlap with each other, and the insertion performance of the electrode terminal to be inserted depends on the opening diameter of the first connection hole of the first plate section.

Hence, the assembling performance of the busbar to the electrode terminal is improved, and the electrode terminal is not caught during insertion at the first connection hole of the first plate section.

With the busbar according to the present invention, the structure of the busbar is made simple and the assembling performance of the busbar to the busbar accommodation section can be improved regardless of the deviation of the first and second plate sections stacked mutually.

The present invention has been described above briefly. Moreover, the details of the present invention will be further clarified by reading the descriptions of the modes (hereafter referred to as "embodiments") for embodying the invention to be described below referring to the accompanying drawings.

BRIEF DESCRIPTION OF THE DRAWINGS

FIGS. 7A and 7B are perspective views illustrating the working processes for a busbar according to Modification 1 of this embodiment, respectively showing the states of the busbar in the working processes;

FIGS. 8A to 8C are perspective views illustrating the working processes for a busbar according to Modification 2 of this embodiment, respectively showing the states of the busbar in the working processes;

DETAILED DESCRIPTION OF THE EXEMPLARY EMBODIMENTS

Embodiments according to the present invention will be described below referring to the accompanying drawings.

Figure 1:
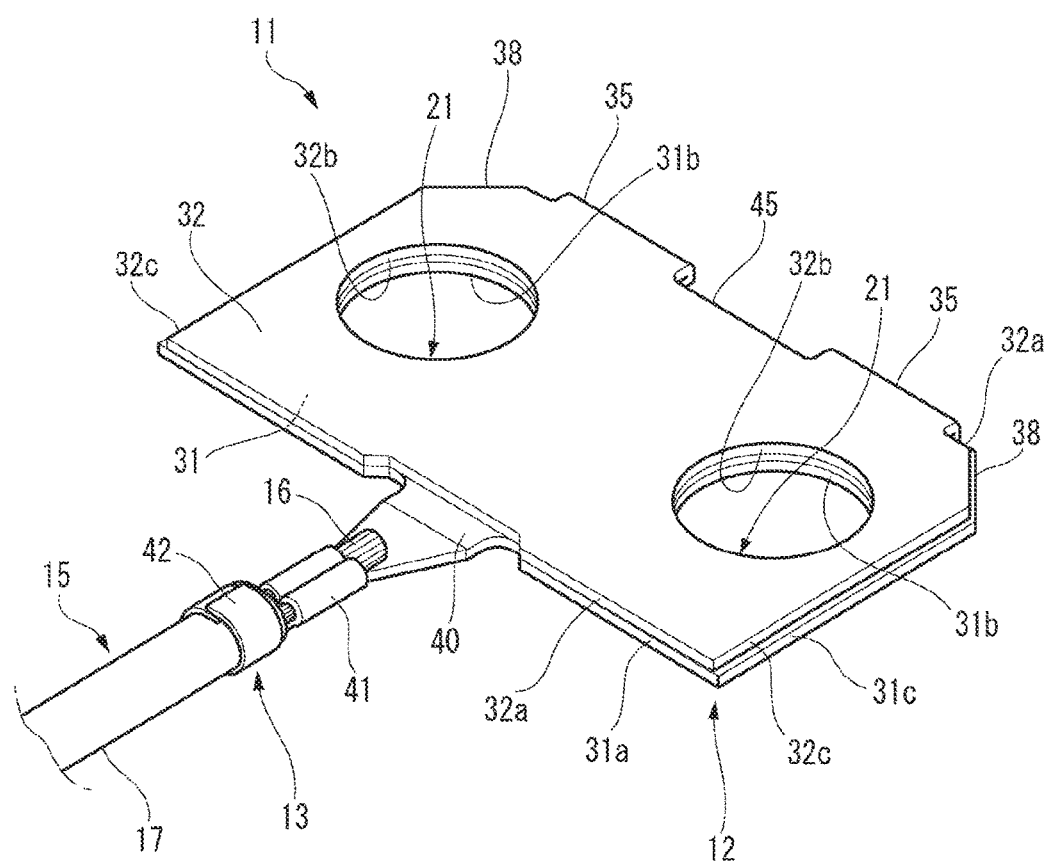
FIG. 1 is a perspective view showing a busbar according to an embodiment of the present invention.

As shown in FIG. 1, a busbar 11 according to an embodiment of the present invention has a body section 12 and a wire connection section 13. The busbar 11 is obtained, for example, by press-working a conductive metal plate. In order to electrically connect the mutually adjacent electrode terminals of the unit cells constituting a battery assembly, the body section 12 is formed into a rectangular plate shape and bridged between the mutually adjacent electrode terminals. The wire connection section 13 is extended from the body section 12 and is connected to the end portion of a wire 15.

The body section 12 is formed into a nearly rectangular shape and has a pair of connection holes 21 through which the positive and negative electrode terminals 61 (see FIGS. 6A and 6B) of the mutually adjacent unit cells are passed. The pair of connection holes 21 is disposed in the longitudinal direction of the body section 12 such that the distance therebetween is the same as the distance between the positive and negative electrode terminals 61 of the mutually adjacent unit cells.

The body section 12 has a plurality of plate sections 31 and 32 (a first plate section and a second plate section) having almost identical outer shapes (nearly rectangular shapes, the plate sections 31 and 32 respectively having a long-side edge section 31a and a short-side edge section 31c and a long-side edge section 32a and a short-side edge section 32c). The plate section 32 serving as an upper layer (uppermost layer) is stacked on the plate section 31 serving as a lower layer (lowermost layer). In this embodiment, the body section 12 is formed into a two-layer structure. One of the long-side edge sections 31a of the plate section 31 and one of the long-side edge sections 32a of the plate section 32 are connected to each other via folding-back sections 35. The folding-back sections 35 are formed while a distance is provided therebetween in the longitudinal direction, and the plate sections 31 and 32 are divided by the folding-back sections 35. The plate sections 31 and 32 are folded back and stacked on each other at the folding-back sections 35. The plate sections 31 and 32 are provided with hole sections (first and second connection holes) 31b and 32b, respectively. When the plate sections 31 and 32 are stacked on each other, these hole sections 31b and 32b communicate with each other, whereby the connection holes 21 of the body section 12 are formed.

Furthermore, the body section 12 is provided with chamfered sections 38 at the corner sections between the long-side edge sections 31a and 32a on the side of the folding-back sections 35 and the short-side edge sections 31c and 32c.

The wire connection section 13 is extended on the opposite side of the joint portion of the plate sections 31 and 32 of the body section 12. A wire 15 is electrically connected to the end section of this wire connection section 13. Hence, the busbar 11 is connected to a voltage detection circuit provided in an ECU (electronic control unit), not shown, via the wire 15 connected to the wire connection section 13. Furthermore, on the basis of the potential difference (voltage) across a pair of electrodes of each unit cell detected by the voltage detection circuit, the ECU detects the remaining capacity, charging/discharging states, etc. of the unit cell.

The wire 15 is a known coated wire having a conductive core wire 16 and an insulation coating 17 for coating this core wire 16. At the end section of the wire 15, the insulation coating 17 is peeled and the core wire 16 is exposed.

The wire connection section 13 is formed at the side edge section of the plate section 31 serving as the lower layer on the opposite side of the folding-back sections 35. The wire connection section 13 is provided at the joint section 40 extended from the plate section 31 serving as the lower layer and has a pair of conductor crimping pieces 41 and a pair of wire caulking pieces 42. At the end section of the wire 15, a portion of the insulation coating 17 is caulked with the wire caulking pieces 42 and secured, and the core wire 16 is crimped with the conductor crimping pieces 41. Hence, the wire 15 is electrically connected to the wire connection section 13. The wire connection section 13 is formed so as to have a predetermined thickness smaller than the thickness of the plate section 31 so as to be suited for the crimping of the wire 15 using a crimping machine.

Moreover, the body section 12 is provided with a cut-out section 45 formed between the folding-back sections 35. The cut-out section 45 is formed at the central sections of one of the long-side edge sections 31a and one of the long-side edge sections 32a. As a result, at one of the long-side edges of the body section 12, the pair of folding-back sections 35 is formed partially while the cut-out section 45 is provided therebetween.

As described above, the body section 12 of the busbar 11 according to this embodiment is structured such that the plurality of plate sections 31 and 32 is stacked on each other, whereby the electric resistance of the body section 12 can be made as small as possible while the enlargement of the wire connection section 13 is suppressed.

Furthermore, the busbar 11 according to this embodiment has an outer shape such that the plate section 31 serving as the lower layer is positioned to the busbar accommodation section 56 of a wire routing member 51 (see FIGS. 6A and 6B) made of insulation resin.

On the other hand, the dimension of the long-side edge section 32a (the maximum width dimension in a direction parallel to the folding-back sections 35) of the plate section 32 serving as the upper layer is set smaller than the dimension of the long-side edge section 31a (the maximum width dimension in a direction parallel to the folding-back sections 35) of the plate section 31 serving as the lower layer.

In other words, in the busbar 11 according to this embodiment, the difference between the dimension of the long-side edge section 31a of the plate section 31 serving as the lower layer and the dimension of the long-side edge section 32a of the plate section 32 serving as the upper layer in a direction being parallel to the folding-back sections 35 (the difference between the maximum width dimensions in a direction parallel to the folding-back sections 35) is set to a dimension capable of allowing the bending deviation amount δ (see FIG. 5B) of the plate section 32 serving as the upper layer.

What's more, in the busbar 11, the connection holes 21 for making electrical connection to the electrode terminals 61 are formed so as to pass through the body section 12. The opening diameter of the hole sections 32b serving as the connection holes in the plate section 32 serving as the upper layer is larger than the opening diameter of the hole sections 31b serving as the connection holes in the plate section 31 serving as the lower layer.

Figure 2A:
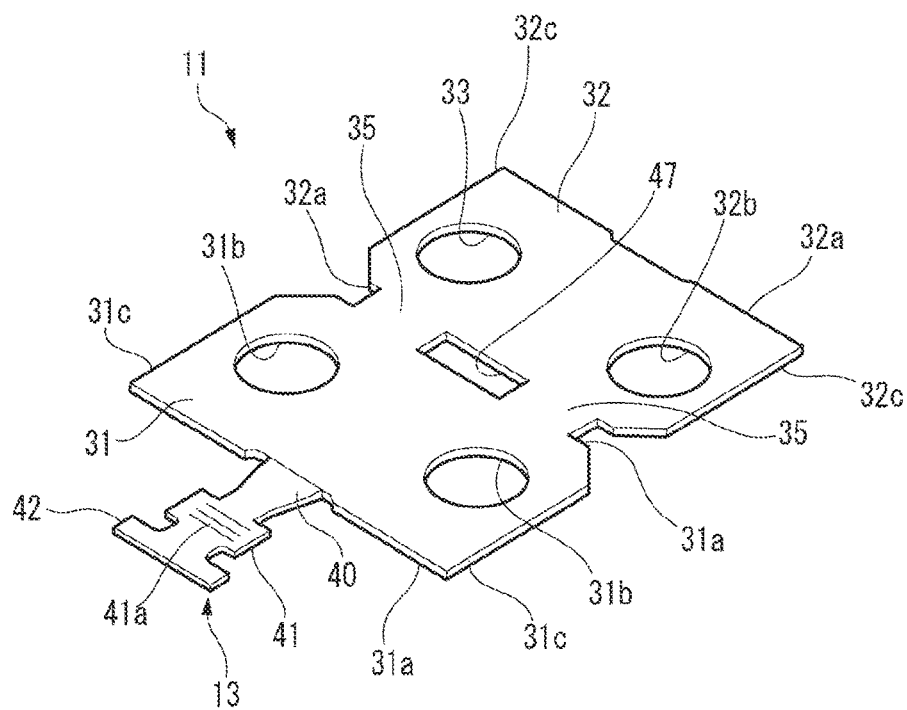
FIGS. 2A and 2B are perspective views illustrating the working processes for the busbar according to this embodiment, respectively showing the states of the busbar in the working processes.

Next, as shown in FIG. 2A, a metal plate is first press-worked so as to be formed into the developed shape of the busbar 11 before bending. At this time, a rectangular opening section 47 for forming the cut-out section 45 is formed by punching at the central section in the extension direction of the folding-back sections 35. The portion where the wire connection section 13 is formed is pressed so as to have the predetermined thickness. In addition, a serration 41a is formed in the inside portions of the conductor crimping pieces 41 where the core wire 16 is crimped. It is preferable that the busbar 11 before bending should be formed from a chain-like terminal material.

Figure 2B:
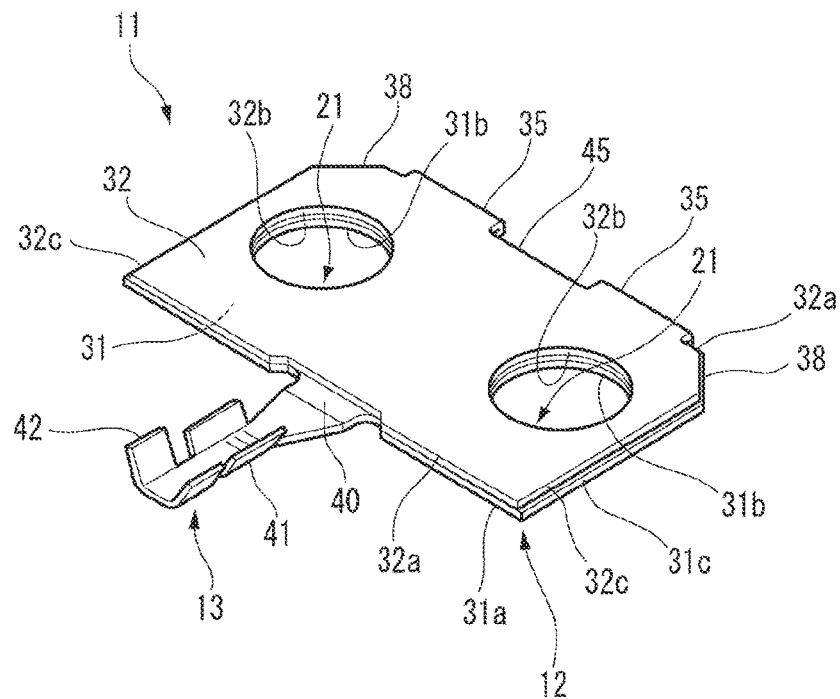

As shown in FIG. 2B, bending is carrying out, whereby the plate section 32 serving as the upper layer is folded back at the folding-back sections 35 and stacked on the plate section 31 serving as the lower layer. At this time, since the body section 12 is folded at the folding-back sections 35 where the opening section 47 is divided into two portions, the cut-out section 45 is formed at one of the long-side edges of the busbar 11. Furthermore, at the wire connection section 13, the conductor crimping pieces 41 and the wire caulking pieces 42 are raised upright so that the wire connection section 13 can be set in the crimping machine for crimping the wire 15.

Consequently, the busbar 11 having the body section 12 in which the two plate sections 31 and 32 are stacked and the wire connection section 13 to which the wire 15 can be connected is obtained.

Figure 3:
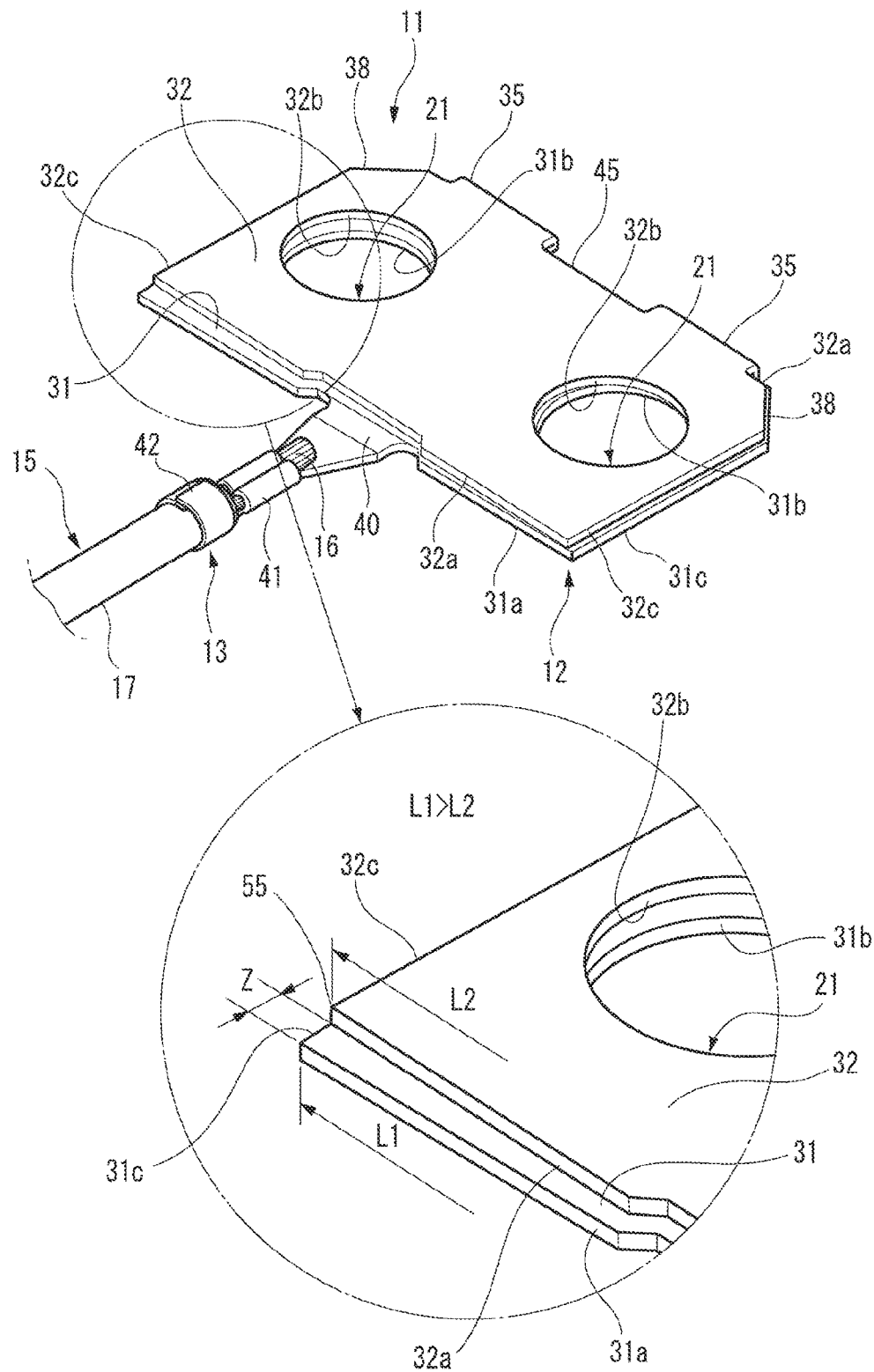
FIG. 3 is a perspective view showing the busbar according to this embodiment in which deviation has occurred during folding, including a main-part enlarged view thereof.

FIG. 3 is a perspective view showing the busbar 11 according to this embodiment in which deviation has occurred during folding, including a main-part enlarged view thereof.

In the busbar 11 according to this embodiment, with respect to the plate section 31 serving as the lowermost layer positioned to the wire routing member 51 (see FIGS. 6A and 6B), the dimension L2 of the long-side edge section 32a of the plate section 32 serving as the upper layer is set smaller than the dimension L1 of the long-side edge section 31a of the plate section 31 serving as the lower layer (L2<L1). As a result, the busbar 11 is configured such that, even if deviation Z occurs when folding is carrying out at the folding-back sections 35, the end 55 of the plate section 32 serving as the upper layer does not deviate from the plate section 31 serving as the lower layer, thereby not protruding therefrom.

Figure 4A:
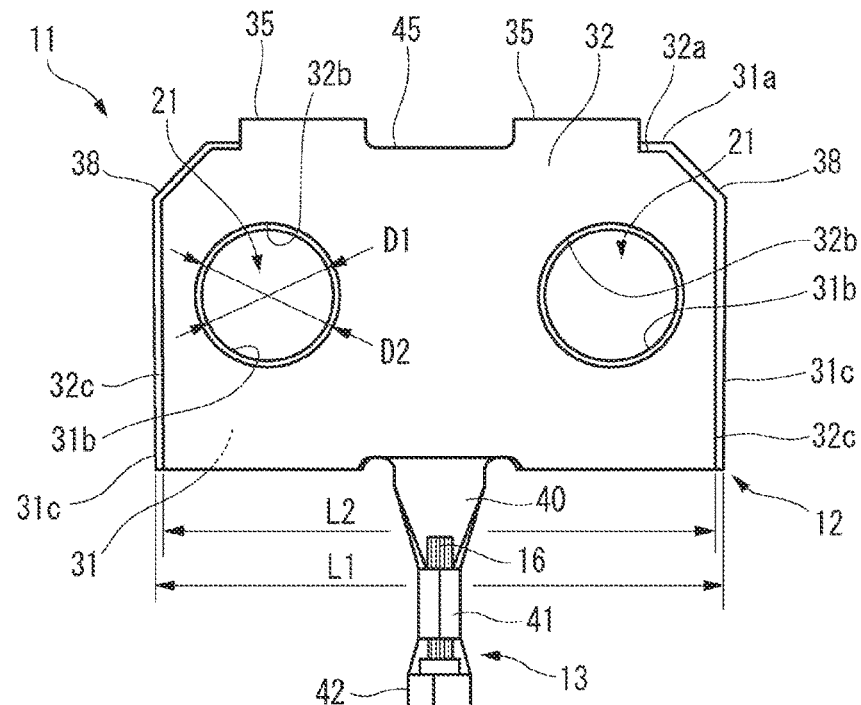
FIG. 4A is a plan view showing the busbar according to this embodiment in which no deviation has occurred.
Figure 4B:
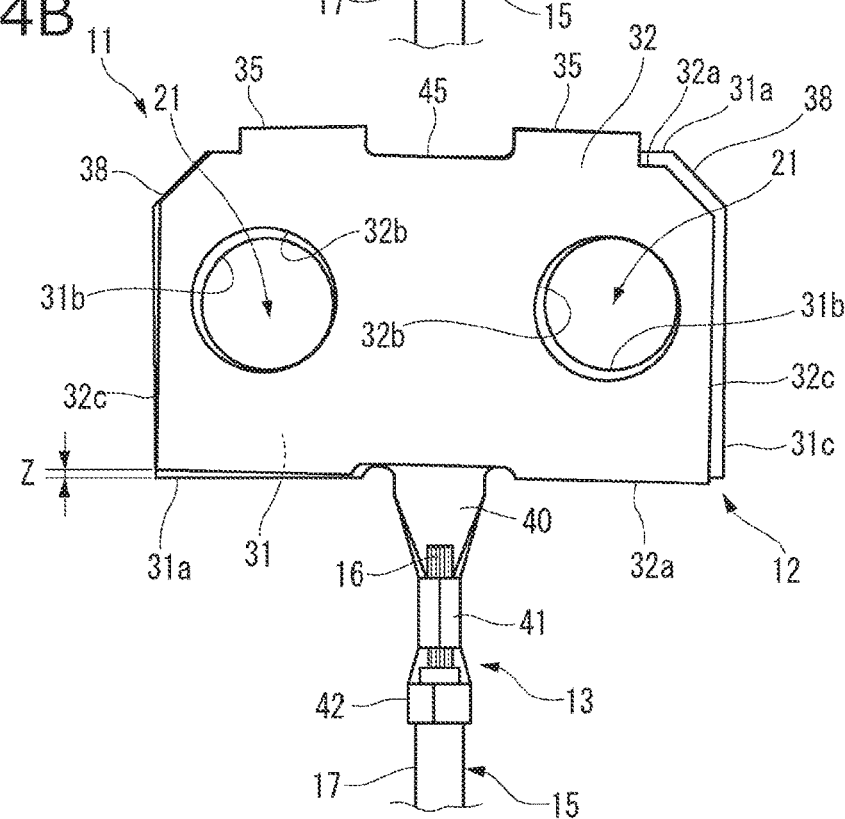
FIG. 4B is a plan view showing the busbar according to this embodiment in which deviation has occurred.

FIG. 4A is a plan view showing the busbar 11 according to this embodiment in which no deviation has occurred, and FIG. 4B is a plan view showing the busbar 11 according to this embodiment in which deviation has occurred.

Since the dimension L2 of the long-side edge section 32a is made smaller, the plate section 32 serving as the upper layer is formed into a shape in which the short-side edge section 32c is moved in parallel more inward from the short-side edge section 31c of the plate section 31 serving as the lower layer. The inward movement dimension of the short-side edge section 32c corresponds to the deviation amount δ. Hence, the dimension L2 of the long-side edge sections 32a has a length obtained by subtracting twice the deviation amount δ from the dimension L1 of the long-side edge sections 31a (L2=L1−2×δ).

Figure 5A:
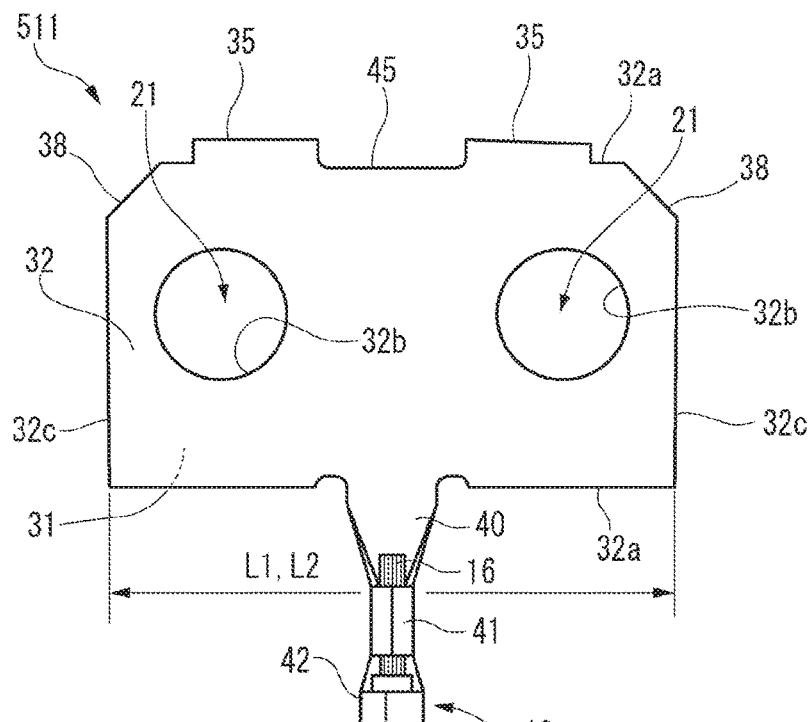
FIG. 5A is a plan view showing a busbar according to a comparative example in which no deviation has occurred.
Figure 5B:
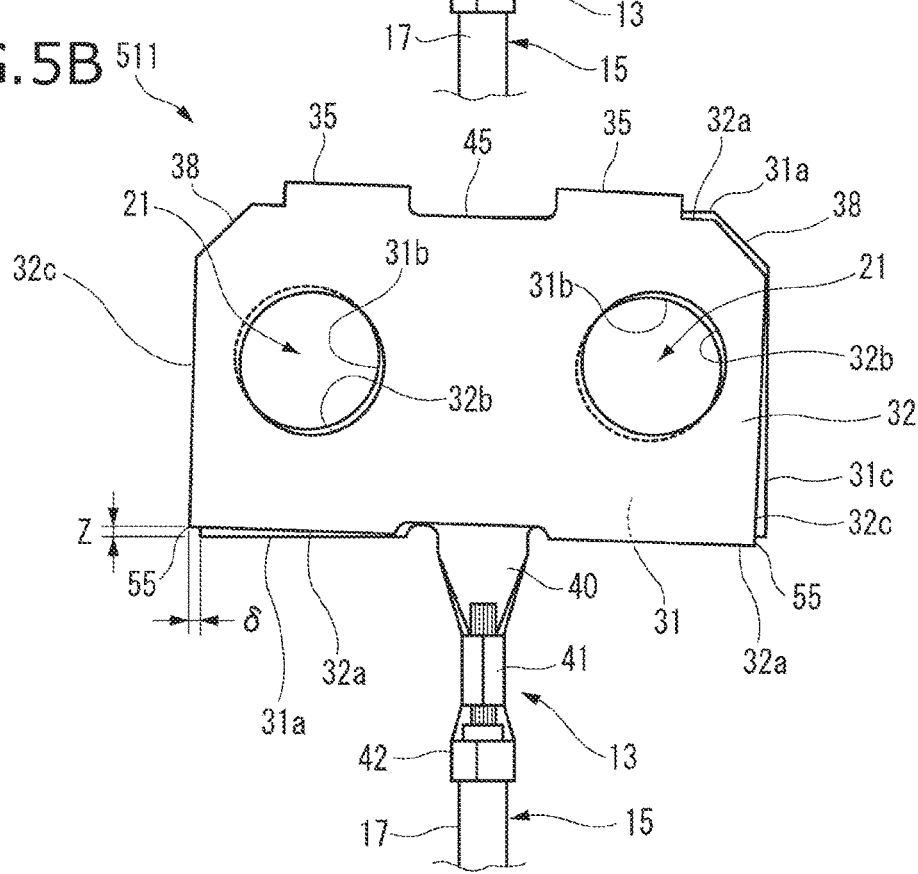
FIG. 5B is a plan view showing the busbar according to the comparative example in which deviation has occurred.

FIG. 5A is a plan view showing a busbar 511 according to a comparative example in which no deviation has occurred, and FIG. 5B is a plan view showing the busbar 511 according to the comparative example in which deviation has occurred.

In the busbar 511 in which the dimension L2 of the long-side edge section 32a of the plate section 32 serving as the upper layer is equal to the dimension L1 of the long-side edge section 31a of the plate section 31 serving as the lower layer, in the case that the deviation Z has occurred during folding at the folding-back sections 35, the end 55 of the plate section 32 serving as the upper layer protrudes from the plate section 31 serving as the lower layer by the deviation amount δ. As a result, the inside accommodation dimension of the busbar accommodation section 56 in the same direction as that of the deviation amount is L1+δ. The busbar accommodation section 56 not provided with this deviation amount δ as a clearance cannot accommodate the busbar 511.

The deviation amount δ is specified, for example, by the processing tolerance of a press-working machine. In addition, elements causing the deviation Z during folding, such as the processing accuracy of the folding work, may be additionally included in the deviation amount δ. In this case, the deviation amount during bending (processing error during bending) is set larger. However, it is preferable that the deviation amount δ should be the minimum value at which the protrusion due to the deviation Z does not occur.

Furthermore, in the busbar 11 according to this embodiment, the opening diameter of the hole section 32b serving as the connection hole in the plate section 32 serving as the upper layer is larger than the opening diameter of the hole section 31b serving as the connection hole in the plate section 31 serving as the lower layer as described above. This setting is intended so that the overlap of the hole section 31b and the hole section 32b due to the deviation Z does not occur. Hence, in this case, the diameter D2 of the hole section 32b of the plate section 32 serving as the upper layer has the dimension obtained by adding twice the deviation amount δ to the diameter D1 of the hole section 31b of the plate section 31 serving as the lower layer (D2=D1+2×δ).

Next, the operation of the above-mentioned configuration will be described.

Figure 6A:
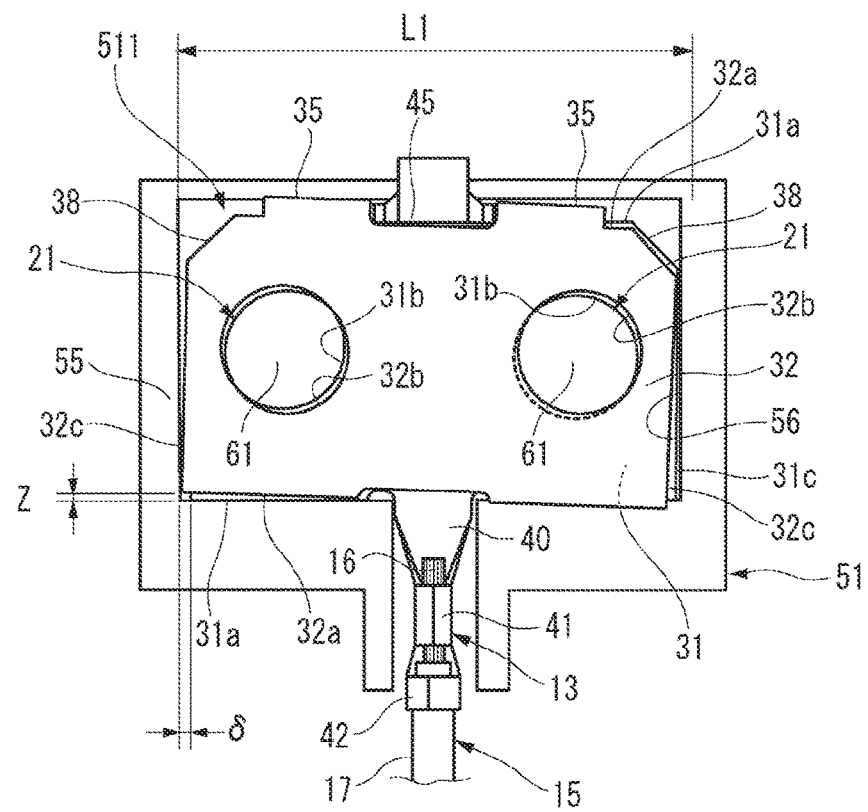
FIG. 6A is a plan view showing the positional relationship between the busbar according to the comparative example and a busbar accommodation section.
Figure 6B:
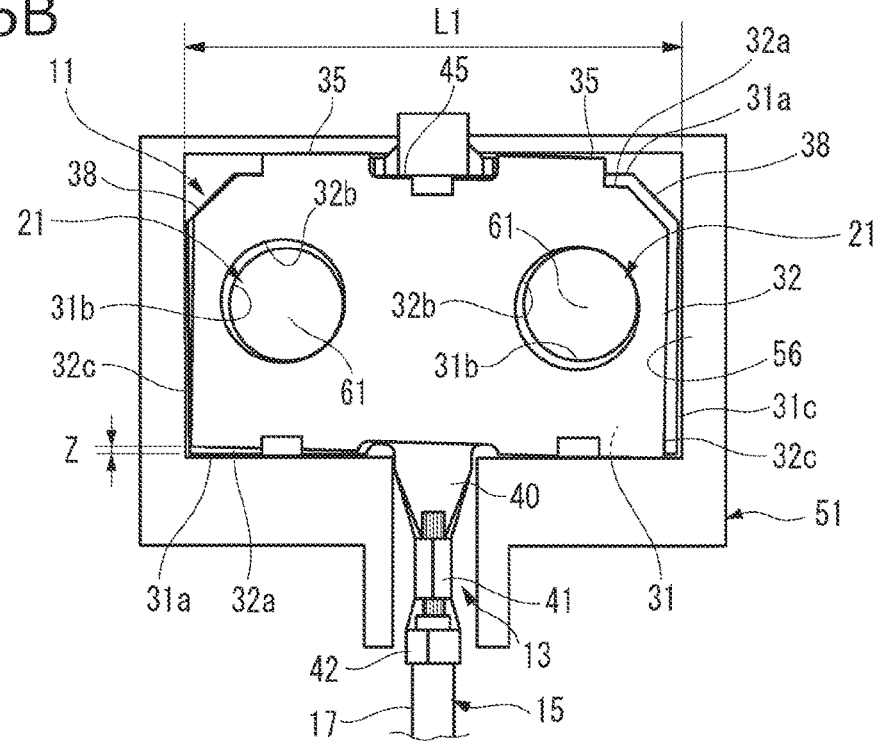
FIG. 6B is a plan view showing the positional relationship between the busbar according to this embodiment and the busbar accommodation section.

FIG. 6A is a plan view showing the positional relationship between the busbar 511 according to the comparative example and the busbar accommodation section 56, and FIG. 6B is a plan view showing the positional relationship between the busbar 11 according to this embodiment and the busbar accommodation section 56.

In the busbar 511 in which the dimension L1 of the long-side edge section 31a of the plate section 31 serving as the lower layer is equal to the dimension L2 of the long-side edge section 32a of the plate section 32 serving as the upper layer, in the case that the deviation Z occurs during folding, the end 55 of the plate section 32 serving as the upper layer protrudes from the plate section 31 serving as the lower layer by the deviation amount δ. Hence, the busbar accommodation section 56 not provided with the deviation amount δ as a clearance cannot accommodate the busbar 511.

On the other hand, in the busbar 11 according to this embodiment, even if the plate section 32 serving as the upper layer has deviated with respect to the plate section 31 serving as the lower layer when folded and stacked, since the outermost dimension of the busbar 11 (the dimension of the side edge section being parallel to the folding-back sections 35) depends on the tolerance of the dimension L1 of the long-side edge section 31a of the plate section 31 serving as the lower layer, the positioning of the busbar 11 to the busbar accommodation section 56 is not affected by the bending deviation amount δ of the plate section 32 serving as the upper layer. Hence, the busbar 11 can be accommodated in the busbar accommodation section 56 even if the deviation Z occurs.

Furthermore, in the busbar 11 according to this embodiment, the difference between the dimension L1 of the long-side edge section 31a of the plate section 31 serving as the lower layer and the dimension L2 of the long-side edge section 32a of the plate section 32 serving as the upper layer in a direction parallel to the folding-back sections 35 is set to a dimension capable of allowing the deviation amount δ of the plate section 32 serving as the upper layer. In other words, L2=L1−2×δ is established to allow the deviation (2×δ) on both the sides of the busbar 11. Consequently, with the busbar 11, the dimensional difference between the plate section 32 serving as the upper layer and the plate section 31 serving as the lower layer is minimized, whereby the busbar 11 can be suppressed from expanding wastefully.

Moreover, in the busbar 11 according to this embodiment, even if the plate section 32 serving as the upper layer has deviated with respect to the plate section 31 serving as the lower layer when folded and stacked, the hole sections 31b and 32b provided in the respective plate sections do not overlap with each other, and the insertion performance of the electrode terminals 61 to be inserted depends on the opening diameter of the hole sections 31b of the plate section 31 serving as the lower layer.

Hence, the assembling performance of the busbar 11 to the electrode terminals 61 is improved, and the electrode terminals 61 are not caught during insertion at the hole sections 32b of the plate section 32 serving as the lower layer.

Next, a busbar according to a modification of this embodiment will be described.

The same components as those of the busbar 11 according to the above-mentioned embodiment are designated by the same numerals and signs and their descriptions are omitted.

Modification 1

FIGS. 7A and 7B are perspective views illustrating the working processes for a busbar 11A according to Modification 1 of this embodiment, respectively showing the states of the busbar 11A in working processes.

As shown in FIG. 7A, in the busbar 11A according to Modification 1, the plate section 31 serving as the lower layer and the plate section 32 serving as the upper layer are joined at one of the short-side edge sections 31c of the plate section 31 and one of the short-side edge sections 32c of the plate section 32 via the folding-back sections 35. The folding-back sections 35 are formed in the crosswise direction of the busbar 11A while a distance is provided therebetween. The plate section 31 serving as the lower layer and the plate section 32 serving as the upper layer are folded back at the folding-back sections 35 and stacked on each other.

Also in Modification 1, the busbar 11A before bending is manufactured by press-working a metal plate.

Next, as shown in FIG. 7B, the plate section 32 serving as the upper layer is folded back at the folding-back sections 35 and stacked on the plate section 31 serving as the lower layer by carrying out bending. Furthermore, the conductor crimping pieces 41 and the wire caulking pieces 42 of the wire connection section 13 are raised upright.

Consequently, it is possible to obtain the busbar 11A having a body section 12A composed of the two plate sections 31 and 32 stacked on each other and having the wire connection section 13 to which the wire 15 can be connected.

Like the busbar 11A according to Modification 1, the busbar according to the present invention may have a structure in which the plate section 31 serving as the lower layer and the plate section 32 serving as the upper layer are joined at one of the short-side edge sections 31c of the plate section 31 and one of the short-side edge sections 32c of the plate section 32 and folded back at the folding-back sections 35. In this case, the difference between the dimension of the short-side edge section 31c of the plate section 31 serving as the lower layer and the dimension of the short-side edge section 32c of the plate section 32 serving as the upper layer in a direction parallel to the folding-back sections 35 is set to a dimension capable of allowing the bending deviation amount δ of the plate section 32 serving as the upper layer.

Modification 2

FIGS. 8A to 8C are perspective views illustrating the working processes for a busbar 11B according to Modification 2 of this embodiment, respectively showing the states of the busbar 11B in the working processes.

As shown in FIG. 8A, the body section 12B of the busbar 11B according to Modification 2 is provided with a plate section 33 serving as an intermediate layer, and the plate section 31 serves as the lowermost layer and the plate section 32 serves as the uppermost layer. The plate section 33 serving as the intermediate layer has long-side edge sections 33a and short-side edge sections 33c and is formed into a nearly rectangular shape almost identical to the shape of the plate section 32. The plate section 33 is joined to the plate section 32 serving as the uppermost layer on the opposite side of the plate section 31 serving as the lowermost layer. The long-side edge section 32a of the plate section 32 and the long-side edge section 33a of the plate section 33 are joined via folding-back sections 35B. The folding-back sections 35B are formed while a distance is provided therebetween, and the plate sections 32 and 33 are folded back via the folding-back sections 35B and stacked on each other. Furthermore, the hole sections 33b constituting the connection holes 21 of the body section 12B are also formed in the plate section 33 serving as the intermediate layer.

Also in Modification 2, the busbar 11B before the bending is manufactured by press-working a metal plate.

The sizes of the plate section 31 serving as the lower layer, the plate section 33 serving as the intermediate layer and the plate section 32 serving as the upper layer are herein set such that the dimensions of the long-side edge section 31a, the long-side edge section 33a and the long-side edge section 32a in a direction parallel to the folding-back sections 35 and 35B are made smaller in this order. In other words, the dimension of the long-side edge section 33a of the plate section 33 serving as the intermediate layer is set smaller than the dimension of the long-side edge section 31a of the plate section 31 serving as the lower layer by (2×δ). Furthermore, the dimension of the long-side edge section 32a of the plate section 32 serving as the upper layer is set smaller than the dimension of the long-side edge section 33a of the plate section 33 serving as the intermediate layer by (2×δ).

Next, as shown in FIG. 8B, the plate section 33 is folded back via the folding-back sections 35B and stacked on the plate section 32 by carrying out bending.

Furthermore, as shown in FIG. 8C, the stacked plate sections 32 and 33 are folded back at the folding-back sections 35 and stacked on the plate section 31 by carrying out bending. As a result, in the busbar 11B, the short-side edge section 31c of the plate section 31 serving as the lower layer, the short-side edge section 33c of the plate section 33 serving as the intermediate layer and the short-side edge section 32c of the plate section 32 serving as the upper layer are stacked stepwise. Furthermore, the conductor crimping pieces 41 and the wire caulking pieces 42 of the wire connection section 13 are raised upright.

Consequently, it is possible to obtain the busbar 11B having a body section 12B composed of the three plate sections 31, 32 and 33 stacked mutually and having the wire connection section 13 to which the wire 15 can be connected.

As in the busbar 11B according to Modification 2, the body section 12B may have three layers formed of the plate sections 31, 32 and 33 stacked mutually. Furthermore, the body section 12B may be provided with a plurality of intermediate layers so as to have four or more layers.

Figure 9:
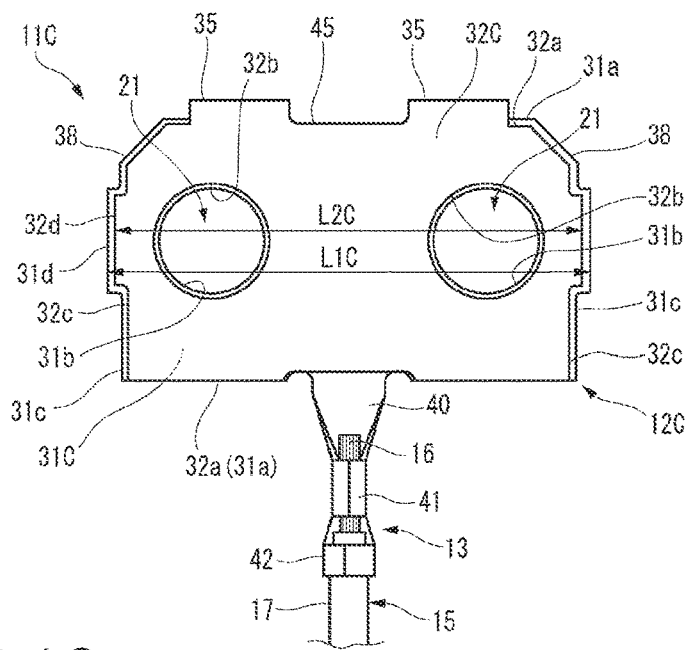
FIG. 9 is a view illustrating a busbar according to Modification 3 of this embodiment.
Figure 10:
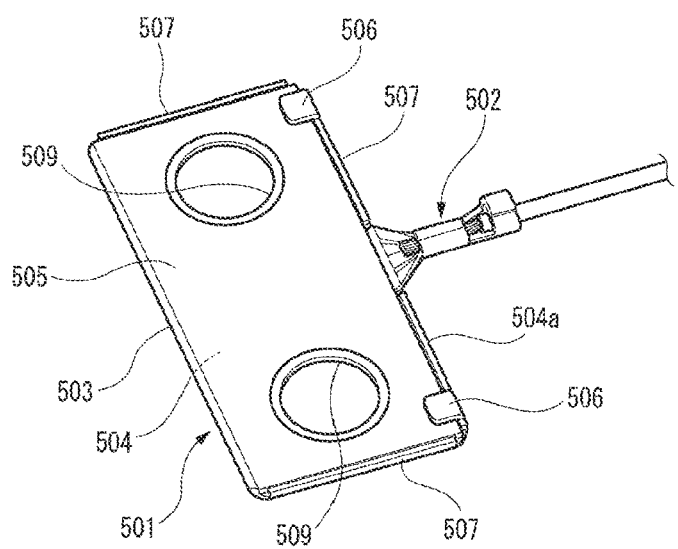
FIG. 10 is a perspective view showing the conventional busbar.

Moreover, in the busbars 11, 11A and 11B according to the above-mentioned embodiments, although the dimensions of the long-side edge sections 31a, 32a and 33a are set as the maximum width dimensions in a direction parallel to the respective folding-back sections 35, the setting in the present invention is not limited to the above-mentioned setting. For example, as in a busbar 11C according to Modification 3 of this embodiment shown in FIG. 9, in the case that the short-side edge section 31c of the plate section 31 and the short-side edge section 32c of the plate section 32 in the body section 12C are respectively provided with protruding sections 31d and protruding sections 32d, the dimension L1C between the tip ends of the protruding sections 31d and the dimension L2C between the tip ends of the protruding sections 32d in a direction parallel to the folding-back sections 35 are respectively set as the maximum width dimensions in a direction parallel to the folding-back sections 35.

Consequently, with each of the busbars 11, 11A, 11B and 11C according to the embodiments, the structure of the busbar is made simple and the assembling performance of the busbar to the busbar accommodation section 56 can be improved regardless of the deviation of the plate sections 31, 32 and 33 stacked mutually.

However, the present invention is not limited to the above-mentioned embodiments, but can be modified or improved as necessary. In addition, the materials, shapes, dimensions, quantities, arrangement positions, etc. of the respective components in the above-mentioned embodiments may be arbitrary and not limited, provided that the present invention can be achieved.

For example, although the body section of the busbar is secured to the electrode terminals of unit cells using nuts in the above-mentioned configuration examples, the body section of the busbar may be secured to the electrode terminals by welding as a configuration of the present invention. Furthermore, the structure for connecting a wire to the wire connection section of the busbar is not limited to crimping connection, but, for example, pressure contact connection in which a wire is bitten by pressure contact blades or welding connection in which the core wire of a wire is welded may also be used for the connection.

Moreover, although the case in which the body section of the busbar is formed into a rectangular plate shape and bridged between the mutually adjacent electrode terminals has been described in the above-mentioned configuration examples, the body section is not limited to be formed into a rectangular shape, but may be formed into a square shape, an oval shape or a polygonal shape more than a quadrilateral shape.

The characteristics of the embodiments of the busbar according to the present invention described above will be briefly summarized and listed in the following items [1] to [3].

[1] A busbar (11, 11A, 11B, 11C) including:
a plate-shaped body section (12, 12A, 12B, 12C) configured to connect adjacent electrode terminals (61) of a plurality of unit cells each having positive and negative electrode terminals; and
a wire connection section (13) integrally provided on and extended from the body section, and configured to connect an end portion of a wire (15),
wherein the body section comprises a first plate section (31, 32, 33), a second plate section (31, 32, 33), and at least one folding-back section (35) connecting the first plate section and the second plate section (31, 32, 33);
wherein the first plate section and the second plate section (31, 32, 33) are stacked mutually by folding-back the at least one folding-back section (35);
wherein the first plate section (31) has an outer shape that is positioned to a busbar accommodation section (51) of a wire routing member made of insulation resin; and
wherein a maximum width dimension (the dimension L3 of the long-side edge section 33a, the dimension L2 of the long-side edge section 32a, the dimension L2C between the tip ends of the protruding sections 32d) of the second plate section (33, 32) in a direction parallel to the at least one folding-back section (35) is smaller than a maximum dimension (the dimension L1 of the long-side edge section 31a, the dimension L3 of the long-side edge section 33a, the dimension L1C between the tip ends of the protruding sections 31d) of the first plate section in the direction parallel to the at least one folding-back section (35).

[2] The busbar (11, 11A, 11B, 11C) set forth in the above-mentioned item [1], wherein a difference between the maximum width dimension of the first plate section (31, 33) and the maximum width dimension of the second plate section (33, 32) in the direction parallel to the at least one folding-back section (35) is set to a dimension capable of allowing a bending deviation amount of the second plate section (33,32) with respect to the first plate section (31,33).

[3] The busbar (11, 11A, 11B, 11C) set forth in the above-mentioned item [1] or [2], wherein a through hole (21) for connection to the electrode terminal (61) is formed in the body section (12, 12A, 12B, 12C);
wherein a first connection hole (hole sections 33b, 32b) of the first plate section (31, 33) and a second connection hole (hole sections 31b, 33b) of the second plate section (33, 32) configures the through hole (21); and
wherein an opening diameter of the second connection hole of the second plate section is larger than that of the first connection hole of the first plate section.

[4] The busbar (11, 11A, 11B, 11C) set forth in any one of the above-mentioned items [1] to [3], wherein the wire connection section (13) is integrally provided on the first plate section (31, 33) of the body section (12, 12A, 12B, 12C).

[5] The busbar (11, 11A, 11B, 11C) set forth in any one of the above-mentioned items [1] to [4], wherein a width dimension of a side edge section of the second plate section (33, 32) along a direction substantially parallel to a folding-back axis of the at least one folding-back section (35) is smaller than that of the first plate section (31, 33) along the direction substantially parallel to the folding-back axis of the at least one folding-back section (35).

[6] The busbar (11, 11A, 11B, 11C) set forth in any one of the above-mentioned items [1] to [5], wherein the at least one folding-back section (35) is two folding-back sections which are separated with an air gap (47).

What is claimed is:
1. A busbar comprising:
a plate-shaped body section configured to connect adjacent electrode terminals of a plurality of unit cells; and
a wire connection section integrally provided on and extended from the body section, and configured to connect an end portion of a wire,
wherein the body section comprises a first plate section, a second plate section, and at least one folding-back section connecting the first plate section and the second plate section;
wherein the first plate section and the second plate section are stacked mutually by folding-back the at least one folding-back section;
wherein the first plate section has an outer shape that is positioned to a busbar accommodation section of a wire routing member made of insulation resin;
wherein a maximum width dimension of the second plate section in a direction parallel to the at least one folding-back section is smaller than that of the first plate section in the direction parallel to the at least one folding-back section;
wherein the first plate section has:
a long-side edge section which serves a longer side of the first plate section, which faces the at least one folding-back section, and which extends in a direction parallel to an extending direction of the at least one folding-back section; and
a pair of short-side edge sections which serve short sides of the first plate section and which extend from both ends of the long-side edge section in a direction substantially perpendicular to an extending direction of the long-side edge section;
wherein two corner sections, each having substantially right angle, are formed by the long-side edge section and the short-side edge sections of the first plate section, respectively,
wherein the second plate section has:
a long-side edge section which serves a longer side of the second plate section, which faces the at least one folding-back section, and which extends in a direction parallel to the extending direction of the at least one folding-back section; and
a pair of short-side edge sections which serve short sides of the second plate section and which extend from both ends of the long-side edge section in a direction substantially perpendicular to an extending direction of the long-side edge section:
wherein two corner sections, each having substantially right angle, are formed by the long-side edge section and the short-side edge sections of the second plate section, respectively,
wherein when the second plate section is folded and stacked to the first plate section by the at least one folding-back section, one of the pair of short-side edge sections of the second plate section is stacked on one of the pair of short-side edge sections of the first plate section; and
wherein a deviation amount between the one of the pair of short-side edge sections of the second plate section and the one of the pair of short-side edge sections of the first plate section at a vicinity of corresponding corner sections of the first plate section and the second plate section in the extending direction of the at least one folding back section is defined as δ, a dimension of the long-side edge section of the first plate section is defined as L1, a dimension of the long-side edge section of the second plate section is defined as L2, and a following formula is satisfied:

$$L2 = L1 - 2 \times \delta.$$

2. The busbar according to claim 1, wherein a difference between the maximum width dimension of the first plate section and the maximum width dimension of the second plate section in the direction parallel to the at least one folding-back section is set to a dimension capable of allowing a bending deviation amount of the second plate section with respect to the first plate section.

3. The busbar according to claim 1, wherein a through hole for connection to the electrode terminal is formed in the body section;
wherein a first connection hole of the first plate section and a second connection hole of the second plate section configures the through hole; and
wherein an opening diameter of the second connection hole of the second plate section is larger than that of the first connection hole of the first plate section.

4. The busbar according to claim 1, wherein the wire connection section is integrally provided on the first plate section of the body section.

5. The busbar according to claim 1, wherein a width dimension of a side edge section of the second plate section along a direction substantially parallel to a folding-back axis of the at least one folding-back section is smaller than that of the first plate section along the direction substantially parallel to the folding-back axis of the at least one folding-back section.

6. The busbar according to claim 1, wherein the at least one folding-back section is two folding-back sections which are separated with an air gap.

\* \* \* \* \*